(12) United States Patent
Sanchez

(10) Patent No.: US 11,468,515 B1
(45) Date of Patent: Oct. 11, 2022

(54) SYSTEMS AND METHODS FOR GENERATING AND UPDATING A VALUE OF PERSONAL POSSESSIONS OF A USER FOR INSURANCE PURPOSES

(71) Applicant: BlueOwl, LLC, San Francisco, CA (US)

(72) Inventor: Kenneth Jason Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 12 days.

(21) Appl. No.: 16/793,647

(22) Filed: Feb. 18, 2020

(51) Int. Cl.
```
G06Q 40/08    (2012.01)
G06Q 30/02    (2012.01)
G06N 20/00    (2019.01)
G06Q 40/02    (2012.01)
G06Q 10/10    (2012.01)
```

(52) U.S. Cl.
CPC ............ *G06Q 40/08* (2013.01); *G06N 20/00* (2019.01); *G06Q 10/10* (2013.01); *G06Q 30/0278* (2013.01); *G06Q 40/02* (2013.01)

(58) Field of Classification Search
CPC ..................................................... G06Q 40/08
USPC ............................................................. 705/4
See application file for complete search history.

(56) References Cited

U.S. PATENT DOCUMENTS

| | | | |
|---|---|---|---|
| 7,107,239 B2 * | 9/2006 | Graff | G06Q 40/10 705/36 R |
| 7,941,330 B1 | 5/2011 | Buentello et al. | |
| 8,041,636 B1 * | 10/2011 | Hunter | G06Q 20/10 705/40 |
| 8,335,700 B2 * | 12/2012 | Zizzamia | G06Q 40/00 705/35 |
| 8,543,430 B1 | 9/2013 | Fields et al. | |
| 9,836,792 B2 | 12/2017 | Dixon | |
| 9,836,793 B2 | 12/2017 | Busque et al. | |
| 10,176,532 B1 | 1/2019 | Hanson et al. | |
| 10,210,577 B1 | 2/2019 | Davis et al. | |
| 10,223,750 B1 | 3/2019 | Loo et al. | |
| 10,262,375 B1 | 4/2019 | Howard | |
| 10,300,373 B2 | 5/2019 | Hickman et al. | |
| 10,311,521 B1 | 6/2019 | Capone et al. | |

(Continued)

*Primary Examiner* — Mike Anderson
*Assistant Examiner* — Paul R KloBerg
(74) *Attorney, Agent, or Firm* — Faegre Drinker Biddle & Reath LLP

(57) ABSTRACT

A computing system including a processor in communication with a memory device for generating a predicted one or more values of personal property items associated with a candidate user enrolling in an insurance policy may be provided. The processor may be configured to: (i) generate a predictive possession value model based at least in part upon a plurality of historical policyholder records, (ii) receive personal and property data associated with the candidate user, (iii) predict a one or more values associated with one or more items owned by the candidate user, (iv) determine a maximum reimbursement amount for the candidate user, (v) receive a claim associated with the candidate user in response to a claim event, wherein the claim includes a list of lost items and/or a list of spared items, (vi) estimate a value associated with the lists of lost items and/or spared items, (vii) adjust the maximum reimbursement amount based at least in part upon the estimated value, and (viii) determine an actual reimbursement amount for the candidate user.

14 Claims, 6 Drawing Sheets

(56) References Cited

U.S. PATENT DOCUMENTS

| | | |
|---|---|---|
| 10,339,604 B1 | 7/2019 | Cook |
| 10,593,109 B1 | 3/2020 | Floyd |
| 10,977,734 B1 | 4/2021 | Kenney |
| 2002/0062249 A1* | 5/2002 | Iannacci .............. G06Q 30/06 705/14.1 |
| 2007/0118410 A1* | 5/2007 | Nadai .................. G06Q 40/08 705/4 |
| 2010/0044430 A1 | 2/2010 | Song et al. |
| 2011/0066454 A1 | 3/2011 | Rosauer et al. |
| 2011/0161117 A1* | 6/2011 | Busque ................ G06Q 50/22 382/307 |
| 2011/0251917 A1 | 10/2011 | Etzioni et al. |
| 2012/0253852 A1 | 10/2012 | Pourfallah et al. |
| 2012/0323609 A1* | 12/2012 | Fini .................... G06Q 10/10 705/4 |
| 2013/0262156 A1* | 10/2013 | Ketzef ................ G06Q 40/08 705/4 |
| 2014/0081675 A1* | 3/2014 | Ives ................... G06Q 40/08 705/4 |
| 2014/0122134 A1 | 5/2014 | Fini |
| 2014/0180725 A1 | 6/2014 | Ton-That et al. |
| 2014/0278573 A1 | 9/2014 | Cook |
| 2014/0279474 A1 | 9/2014 | Evans et al. |
| 2015/0006206 A1* | 1/2015 | Mdeway ............. G06Q 40/08 705/4 |
| 2015/0127430 A1* | 5/2015 | Hammer, III ....... G06Q 30/0206 705/7.35 |
| 2015/0178851 A1* | 6/2015 | Dutt .................. G06Q 40/08 705/4 |
| 2015/0206249 A1* | 7/2015 | Fini .................. G06Q 40/00 705/4 |
| 2016/0035038 A1* | 2/2016 | Perkins .............. G06Q 40/08 705/4 |
| 2016/0180468 A1* | 6/2016 | Buss ................. G06Q 50/16 707/738 |
| 2016/0232615 A1 | 8/2016 | Le |
| 2017/0323319 A1 | 11/2017 | Rattner et al. |
| 2019/0005586 A1 | 1/2019 | Lei et al. |
| 2019/0080325 A1 | 3/2019 | Pourfallah et al. |
| 2020/0302322 A1 | 9/2020 | Tukiainen et al. |
| 2021/0090177 A1 | 3/2021 | Sears |

\* cited by examiner

SYSTEMS AND METHODS FOR GENERATING AND UPDATING A VALUE OF PERSONAL POSSESSIONS OF A USER FOR INSURANCE PURPOSES

FIELD OF THE DISCLOSURE

The present disclosure relates to generating a predicted one or more values of personal property items associated with a user, and more particularly, to computer-based systems and methods for generating a predicted one or more values of personal property items associated with a user for insurance-related purposes.

BACKGROUND

Some insurance policies (e.g., renter's insurance, rental insurance, homeowner's insurance, and/or property insurance) provide coverage for loss or damage to the personal possessions of a policyholder during a policy claim (e.g., a formal request by the policyholder to an insurance provider for reimbursement for one or more personal possessions covered under an insurance policy). Loss events may include residential fires, theft, vandalism and/or other events that cause partial or complete loss of the personal possessions of the policyholder. Policy coverage is associated with the amount of risk or liability that is covered by the insurance provider for the policyholder's possessions during these loss events. Insurance providers set policy premiums based at least in part upon a number of factors including the amount of coverage that the policy provides (e.g., policy coverage or insurance coverage). In other words, the policy coverage is related to the amount of funds an insurance provider may have to pay a policyholder for damaged or lost possessions. As such, a policy coverage amount should aim to cover the amount it would cost to replace or repair each of the policyholder's personal possessions.

When users register for insurance policies, the users may be needed to provide an inventory list including items that the users wish to have covered under the insurance policy. The inventory list may also include values associated with the items of the inventory list. However, creating and maintaining these lists may be very time consuming for users. Accordingly, the lists may not be accurate or detailed.

Insurance premiums, coverage rates, and insurance claims may depend on the inventory list of the personal possession of the user. It would be advantageous for both users and the insurance providers to generate and update a complete and accurate list of personal possessions. The inventory of personal possessions may aid the insurance provider in determining policy rates and additionally aid the policyholder in determining the amount of coverage they will need. Further, during a policy claim, the inventory list may be used to determine reimbursement amounts for each possession.

BRIEF SUMMARY

The present embodiment may relate to systems and methods systems and methods for generating a predicted one or more values of personal property items associated with a candidate user enrolling in an insurance policy.

In one aspect, a computing system for generating a predicted one or more values of personal property items associated with a candidate user enrolling in an insurance policy may be provided. The computing system may include one processor in communication with at least one memory device, and the at least one processor may be configured to: (i) generate a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receive personal data and property data associated with the candidate user, (iii) predict, based at least in part upon the generated predictive possession model, a one or more values associated with one or more items owned by the candidate user based at least in part upon the received personal data and property data, (iv) determine a maximum reimbursement amount for the candidate user based at least in part upon the predicted one or more values, (v) receive a claim associated with the candidate user in response to a claim event, wherein the claim includes one of a list of lost items and a list of spared items, (vi) estimate a value associated with the claim, (vii) adjust the maximum reimbursement amount based at least in part upon the estimated value associated with the claim, and/or (viii) determine an actual reimbursement amount for the candidate user based at least in part upon the adjusted maximum reimbursement. The computing system may include additional, less, or alternate functionality, including that discussed elsewhere herein.

In another aspect, a computer-implemented method for generating a predicted one or more values of personal property items associated with a candidate user enrolling in an insurance policy based at least in part upon a computing system including one processor in communication with at least one memory device may be provided. The method may include: (i) generating a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receiving personal data and property data associated with the candidate user, (iii) predicting, based at least in part upon the generated predictive possession model, a one or more values associated with one or more items owned by the candidate user based at least in part upon the received personal data and property data, (iv) determining a maximum reimbursement amount for the candidate user based at least in part upon the predicted one or more values, (v) receiving a claim associated with the candidate user in response to a claim event, wherein the claim includes one of a list of lost items and a list of spared items, (vi) estimating a value associated with the claim, (vii) adjusting the maximum reimbursement amount based at least in part upon the estimated value associated with the claim, and/or (viii) determining an actual reimbursement amount for the candidate user based at least in part upon the adjusted maximum reimbursement. The method may include additional, less, or alternate actions, including those discussed elsewhere herein.

In yet another aspect, at least one non-transitory computer-readable media having computer-executable instructions thereon may be provided, wherein when executed by at least one processor of a computing system causes the at least one processor to: (i) generate a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receive personal data and property data associated with the candidate user, (iii) predict, based at least in part upon the generated predictive possession model, a one or more values associated with one or more items owned by the candidate user based at least in part upon the received personal data and property data, (iv) determine a maximum reimbursement amount for the candidate user based at least in part upon the predicted one or more values, (v) receive a claim associated with the candidate user in response to a claim event, wherein the claim includes one of a list of lost items and a list of spared items, (vi) estimate a value associated with the claim, (vii) adjust the maximum reimbursement amount based at least in part upon the estimated value associated with the claim, and/or (viii) determine an actual reimbursement amount for the candidate user based at least in part upon the adjusted maximum reimbursement. The instructions may direct additional, less, or alternate functionality, including that discussed elsewhere herein.

Depending upon embodiment, one or more benefits may be achieved. These benefits and various additional objects, features and advantages of the present invention can be fully appreciated with reference to the detailed description and accompanying drawings that follow.

BRIEF DESCRIPTION OF THE DRAWINGS

There are shown in the drawings arrangements which are presently discussed, it being understood, however, that the present embodiments are not limited to the precise arrangements and are instrumentalities shown, wherein.

Figure 1:
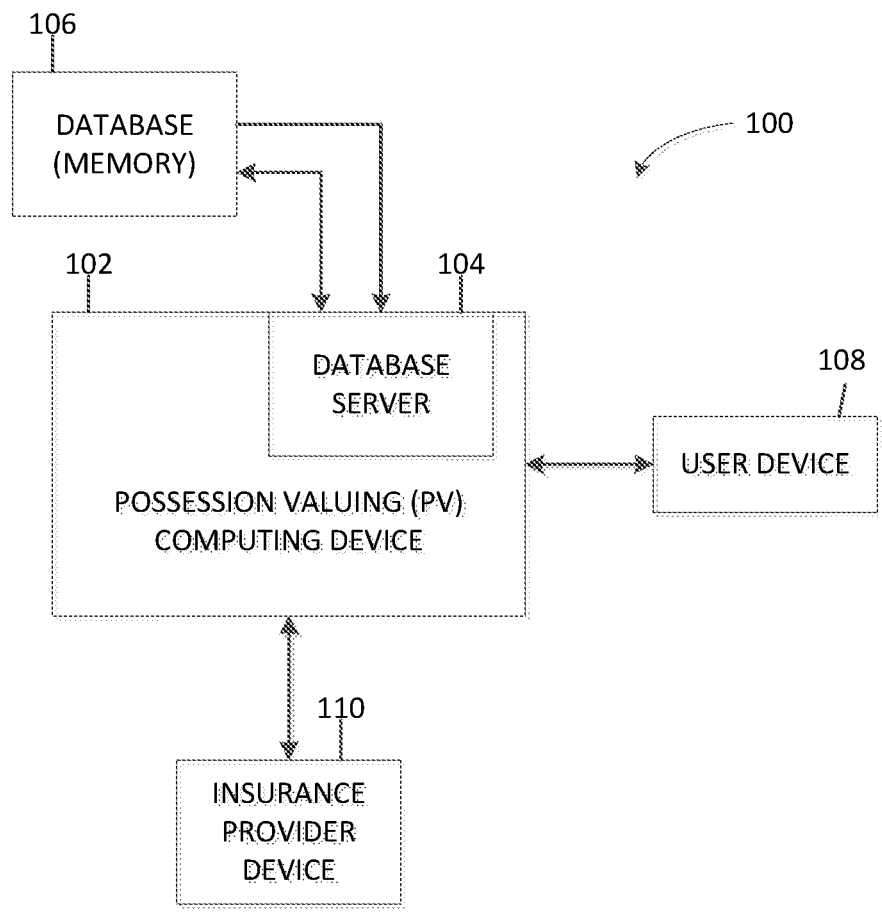
FIG. 1 illustrates a simplified block diagram of an exemplary possession valuing (PV) computer system.

The Figures depict preferred embodiments for purposes of illustration only. One skilled in the art will readily recognize associated with the following discussion that alternative embodiments of the systems and methods illustrated herein may be employed without departing associated with the principles of the disclosure.

DETAILED DESCRIPTION OF THE DRAWINGS

The present embodiments may relate to, inter alia, systems and methods for generating a predicted one or more values of personal property items associated with a candidate user enrolling in an insurance policy. In one exemplary embodiment, the systems and methods may be associated with and/or performed by a possession valuing ("PV") computing device (also referred to herein as a PV server, a PV computing system, and a PV computer system), and the PV computing device may be associated with an insurance provider.

The systems and methods described herein may generate a possession value model for predicting one or more values of one or more items (e.g., personal possessions) associated with a user based at least in part upon personal data and property data of the user. The predicted one or more values of items may be used for insurance purposes (e.g., renter's insurance, rental insurance, homeowner's insurance, and/or property insurance that provide insurance coverage of personal property). The systems and methods described herein may use the predicted one or more values to determine a maximum reimbursement amount associated with an insurance policy of a user. Further, in response to receiving a claim associated with the user, the systems and methods described herein may estimate a value of lost or spared items included in the claim. The systems and methods described herein may adjust the maximum reimbursement amount based at least in part upon the estimated value and determine an actual reimbursement amount for the user.

Examples of Value of Personal Possessions

In the exemplary embodiment, the PV computing system may include a PV computer server or device and may be commutatively linked to one or more databases (e.g., a historical policyholder database). The historical policyholder database may include a plurality of historical policyholder records associated with a plurality of policyholders. Each of the plurality of historical policyholder records may include (i) historical policy data associated with the policyholders including one or more values associated with one or more items owned by the policyholders (e.g., values of electronic devices, personal transportation items, like bikes and scooters, computers/laptops, furniture, jewelry, clothing, etc.) and historical insurance claims, (ii) personal data (e.g., age, sex, occupation, education level, marital status, family size, etc.) associated with the policyholders, and (iii) property data (e.g., residence square footage, residence location, residency information, etc.) associated with the plurality of policyholders.

The one or more values associated with one or more items owned by the policyholders, for example, may be the values of personal possessions supplied by the policyholders when the policyholders first obtained insurance coverage for the personal possessions. The values may also be assigned to the personal possessions by the PV computing system (e.g., the PV computing system may perform a search, like an internet search, for the value associated with each personal possession of the policyholders).

Examples of Possession Model Generation

In the exemplary embodiment, the PV system may retrieve, associated with the historical policyholder database, at least a subset of the plurality of historical policyholder records that include personal data, property data, and values of the personal possessions of the policyholders associated with the plurality of historical policyholder records. This subset of historical policyholder records may be used to generate a possession model that relates the personal data and the property data to the values of personal possessions of the policyholders. For example, the PV system may predict a value associated with the personal property of 35-year-old men who make an average of $80,000 per year and live in a residence between 1,500 and 2,200 square feet.

The values of the personal property of the policyholders may be associated with a cost to repair or replace the personal possessions. The possession model may further include a confidence estimate associated with the values of the personal possessions (e.g., a percentage of confidence that the value of the personal possession falls within a range of values). The confidence estimate may be a fixed value (e.g., as set by an insurance provider) for each user, or the confidence value may change associated with user to user. For example, the range of values may be associated with the PV system having 95% confidence that the value of the predicted personal possessions fall within the range of values. For example, the PV system may find that 35-year-old men who make an average of $80,000 per year and live in a residence between 1,500 and 2,200 square feet are associated with personal property with a value between $30,000 and $45,000 in 95% of instances.

The possession value model may be generated based at least in part upon any suitable technique (e.g., machine learning, artificial intelligence, neural networks, etc.), as further described herein. Further, the possession value model may be continually updated by the PV system as the PV system retrieves more historical policyholder data and feedback associated with users (e.g., associated with the accuracy of the possession value model).

Examples of Predicting Values of Personal Possessions for a User

Users (e.g., candidate users) may wish to register and/or enroll in a possession valuing (PV) service associated with the PV system when, for example, the users enroll in an insurance policy. For example, a user may want to obtain comprehensive insurance coverage for the personal possessions of the user without having to go through the timely process of creating an inventory and associated value of each item that the user owns. In some embodiments, the PV system (and therefore the PV service) may be associated with an insurance provider associated with the insurance policy. The PM system may prompt the users to enter personal data (e.g., age, sex, income level, employment status, marital status, etc.) and property data (e.g., residence location, residency information including whether the users live in an apartment, a condo, a house, etc., and square footage data) associated with the users when the users enroll and/or register with the PV service.

The PV system may utilize the possession value model to predict a value of personal possessions that are owned by a user based at least in part upon the personal data and property data associated with the user. In other words, the PV system may utilize the set of personal data and property data as an input to the possession value model to predict a value of personal possessions associated with the user.

For example, a user may provide the PV system with personal data indicating that the user is a 21-year-old female attending a university and property data indicating that the user lives in a two bedroom apartment that is 600 square feet in New York City. The PV system may input the personal data and the property data of the user into the possession value model of the PV system, and the PV system may predict, with 95% confidence, that the user is associated with personal possession items with a value of between $7,000 and $15,000.

Examples of Determining Maximum Reimbursement Amounts and User Interaction

After the possession value model generates the predicted one or more values of personal possession items associated with the user, the PV system may prompt the user to confirm the accuracy of the value. For example, the PV system may display the predicted one or more values on a computing device (e.g., mobile device and/or computer) of the user. In some embodiments, the PV system may also display a generic listing of items associated with the predicted one or more values (e.g., electronics, personal mobility devices, clothing, jewelry, furniture, etc.). The user may confirm that the predicted one or more values is correct (e.g., based at least in part upon "one-click") and/or adjust the value through the user device. The PV system may continue adjusting the value as prompted by the user input until the user confirms that the predicted one or more values is correct.

The PV system may generate a maximum reimbursement amount for an insurance policy of a user based at least in part upon the predicted one or more values of the personal possession items of the user. The maximum reimbursement amount may relate to an amount the user would receive associated with the insurance provider associated with the insurance policy in a "total loss" event (e.g., if all of personal possession items were lost in a claim event). In some embodiments, the PV system may allow the user to choose to be covered for a percentage of the maximum reimbursement amount for lower insurance premiums for the insurance policy. For example, a user may wish to pay a smaller insurance premium if the user does not think that the personal possession items of the user have a high risk of being damaged and/or stolen, and therefore the user may choose, for example, to be covered for 70% of the maximum reimbursement amount. Accordingly, the PV system may reduce a predetermined insurance premium of the insurance policy covering the full maximum reimbursement by 70%.

Once the user has confirmed the predicted one or more values and/or adjusted the maximum reimbursement amount for which the user wishes to be covered, the PV system may store the predicted one or more values, the maximum reimbursement amount, and the associated user or user identifier in a database associated with the PV system. In the exemplary embodiment, the PV system may be in communication with and/or part of an insurance provider device (e.g., associated with the insurance provider associated with the insurance policy of the user). Accordingly, the PV system may finalize the enrollment of the user in the insurance policy after the user accepts the terms and conditions of the insurance policy (e.g., such that once the user confirms the predicted one or more values and maximum reimbursement amount, the insurance policy of the user is immediately effective). In other embodiments, the PV system may transmit the insurance policy, predicted one or more values, and maximum reimbursement amount to the insurance provider device such that the insurance provider may finalize the enrollment of the user in the insurance policy and receive any additional information associated with the user (e.g., payment information).

Examples of Determining Actual Reimbursement after a Claim Event

In response to a claim event (e.g., a natural disaster, fire, burglary, theft, etc.), the user may submit a claim to the insurance provider associated with the insurance policy of the user (e.g., through the PV system) to request reimbursement for items associated with the user (e.g., personal possession items) that are covered by the insurance policy of the user. The claim may include a list of items that were lost (e.g., a list of lost items) and/or a list of items that were spared (e.g., a list of spared items). For example, if the claim event (e.g., a fire or a flood) was almost a total loss event, and the user only had a few spared items, the user may include a list of spared items in the claim. Further, if the claim event (e.g., burglary or theft) only resulted in a few damaged/stolen items, the user may include a list of lost items in the claim. In some embodiments, the claim may include images and/or video such that the PV system may determine the list of lost items and/or the list of spared items. Further, the claim may include a police report or other evidence that the claim event took place.

The PV system may estimate a value associated with the list of lost items and/or the list of spared items. The PV system may estimate the value associated with the list of lost items and/or the list of spared items in substantially the same way that the PV system predicts the one or more values associated with one or more items owned by the user. That is, the PV system may estimate the value of the list of lost items and/or the list of spared items by adding an estimated value of each item together. For example, the PV system may estimate the value of the list of lost/spared items by comparing the list of lost/spared items to the predicted one or more values of items to determine how expansive the list of lost/spared items is and estimating the value of the list of lost/spared items based at least in part upon the comparison. That is, if the list of spared items is very short and includes, for example, some clothing and a mobile device of the user, the PV system may determine that most of the items owned by the user are lost. Accordingly, the PV system may estimate that a value associated with the list of lost items is 90% of the predicted one or more values of the items owned by the user. Further, for example, the PV system may retrieve the value associated with each item of the lost/spared list (e.g., through an internet search or associated with a third party database that stores one or more values associated with one or more items) and add the values of each item to determine an estimated value associated with the lost/spared items.

The PV system may adjust the maximum reimbursement amount based at least in part upon the estimated value associated with the list of lost items and/or the list of spared items. For example, if a list of spared items is included in the claim by the user, the PV system may reduce the maximum reimbursement by the estimated value of the spared items. Further, for example, if a list of lost items is included in the claim by the user, the PV system may compare the estimated value of the lost items to the predicted one or more values of items to estimate a value of the spared items. For example, if two televisions of the user (and nothing else) was taken during a burglary, the PV system may estimate that a value of the spared items is 85% of the predicted one or more values of the items. The PV system may then reduce the maximum reimbursement amount by the estimated value of the spared items (e.g., 85% of the predicted one or more values of the items).

The PV system may use the adjusted reimbursement maximum amount to determine an actual reimbursement amount for the user. In some embodiments, the actual reimbursement amount may be the adjusted reimbursement maximum amount. For example, the PV system may predict that the one or more values associated with one or more items owned by the user is $10,000, and the PV system may determine that the maximum reimbursement amount for the candidate user is $8,000. The user, in response to a claim event, may send a claim to the PV system including a list of spared items including three pairs of clothes, a laptop, and a mobile device of the user. The PV system may estimate the value of the spared items to be $2,500, and the PV system may adjust the reimbursement maximum amount (e.g., by subtracting the estimated value of the spared items associated with the maximum reimbursement amount) to be $5,500. Accordingly, the PV system may determine that an actual reimbursement amount for the user is $5,500. In other embodiments, the insurance policy of the user may include a deductible that the user must pay before the actual reimbursement amount is distributed. For example, if the user has a deductible of $500, the PV system may determine that an actual reimbursement amount for the user is $5,000 (e.g., by subtracting the deductible associated with the adjusted maximum reimbursement amount).

The PV system may further provide the adjusted reimbursement amount to the user. In some embodiments, the PV system may provide the adjusted reimbursement amount to the user on behalf of the insurance provider associated with the user and the insurance policy of the user. In other embodiments, the insurance provider may directly provide the user with the actual reimbursement amount. The adjusted reimbursement amount may be in the form of a check, a direct deposit, cash, a digital wallet credit, and/or a prepaid card.

At least one technical problems addressed by this system may include: (i) difficulty of users to generate an accurate value of personal possession items, (ii) arduous processes associated with insurance claims, (iii) inability of insurance providers to ensure accuracy of values of personal possessions of users.

The methods and systems described herein may be implemented based at least in part upon computer programming or engineering techniques including computer software, firmware, hardware, or any combination thereof, where the technical effect may be achieved by performing at least one of the following steps: (i) generating a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receiving personal data and property data associated with the candidate user, (iii) predicting, based at least in part upon the generated predictive possession model, a one or more values associated with one or more items owned by the candidate user based at least in part upon the received personal data and property data, (iv) determining a maximum reimbursement amount for the candidate user based at least in part upon the predicted one or more values, (v) receiving a claim associated with the candidate user in response to a claim event, wherein the claim includes one of a list of lost items and a list of spared items, (vi) estimating a value associated with the claim, (vii) adjusting the maximum reimbursement amount based at least in part upon the estimated value associated with the claim, and/or (viii) determining an actual reimbursement amount for the candidate user based at least in part upon the adjusted maximum reimbursement.

At least one technical solution addressed by this system may include: (i) enabling users to generate an accurate value of personal possession items based solely upon personal data and property data of the users, (ii) streamlining insurance claim processes, and (iii) allowing insurance providers to ensure that values of personal possessions of users are accurate.

Exemplary Computer Networks

FIG. 1 depicts an exemplary possession valuing (PV) computer system 100 that may be used in predicting a value of personal property items associated with a candidate user (e.g., associated with user device 108) enrolling in an insurance policy. In the exemplary embodiment, PV computer system 100 may include a possession valuing (PV) computing device 102.

In the exemplary embodiment, PV computing device 102 may be in communication with a user computing device 108 and an insurance provider device 110. PV computing device 102 may also be in communication with a database 106 and may communicate with database 106 through a database server 104. In some embodiments, database server 104 is a component of PV computing device 102. In other embodiments, database server 104 is separate associated with PV computing device 102. In the illustrated embodiment, insurance provider device 110 is separate associated with PV computing device 102. In other embodiments, PV computing device 102 may be a component of insurance provider device 110. In some embodiments, PV computer system 100 may include a plurality of PV computing devices 102, user computing devices 108, insurance provider devices 110, and/or databases 106.

In the exemplary embodiment, user computing device 108 may be a computer that includes a web browser or a software application, which enables user computing device 108 to access remote computer devices, such as PV computing device 102, based at least in part upon the Internet or other network. More specifically, user computing device 108 may be communicatively coupled to PV computing device 102 through many interfaces including, but not limited to, at least one of the Internet, a network, such as the Internet, a local area network (LAN), a wide area network (WAN), or an integrated services digital network (ISDN), a dial-up-connection, a digital subscriber line (DSL), a cellular phone connection, and a cable modem. User computing device 108 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

Insurance provider device 110 may be communicatively coupled with PV computing device 102. In some embodiments, insurance provider device 110 may be associated with, or is part of a computer network associated with an insurance provider, or in communication with a computer network of an insurance provider. In other embodiments, insurance provider device 110 may be associated with a third party and is merely in communication with the computer network of the insurance provider. More specifically, insurance provider device 110 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance provider device 110 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 110 may be communicatively coupled to a database 106. In one embodiment, database 106 may include policyholder data (e.g., historical policyholder data), personal/property data associated with users, reimbursement data, value data, and model data. In the exemplary embodiment, database 106 may be stored remotely associated with the PV computing device 102. In some exemplary embodiments, the users may access database 106 via user computing device 108 by logging into PV computing device 102, as described herein.

Figure 2:
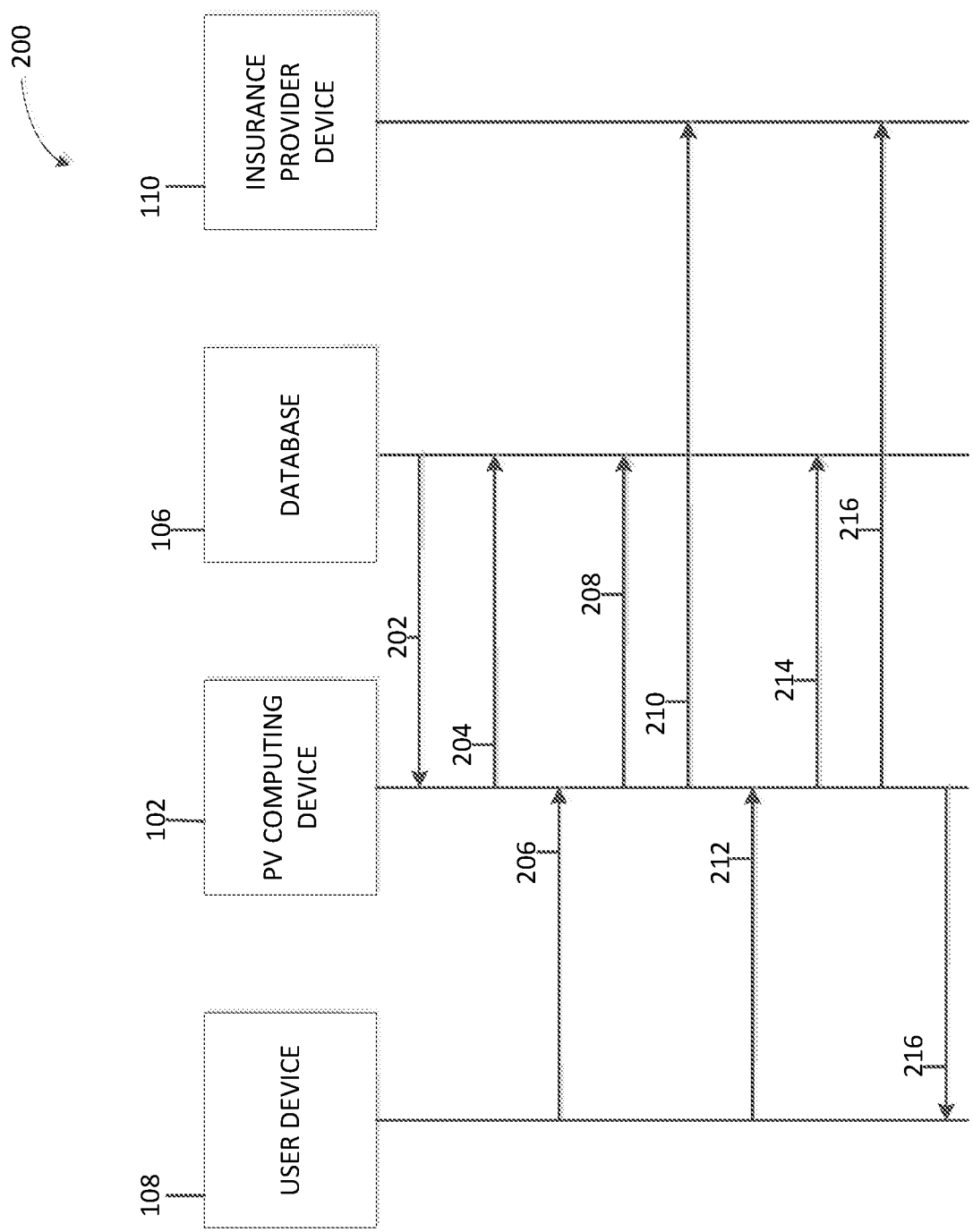
FIG. 2 is a schematic diagram illustrating an exemplary process that may be performed by the PV computer system shown in FIG. 2.

Exemplary Processes for Generating and Updating an Inventory List of Personal Possessions FIG. 2 is a flow diagram of a process 200 that is associated with PV computer system 100 (shown in FIG. 1) for generating a predicted one or more values of personal property items associated with a candidate user enrolling in an insurance policy.

PV computing device 102 may receive historical policyholder records 202 associated with a plurality of policyholders associated with database 106. Historical policyholder records 202 may include (i) historical policy data including one or more values associated with one or more items owned by each policyholder of the plurality of policyholders, (ii) personal data associated with each policyholder of the plurality of policyholders, and (iii) property data associated with each policyholder of the plurality of policyholders. Based at least in part upon historical policyholder records 202, PV computing device 102 may generate a predictive possession value model 204. Predictive possession value model 204 may relate one or more values of one or more items associated with the policyholders to personal data (e.g., demographics data) and property data (e.g., residence location, residence square footage, etc.) of the policyholders. PV computing device 102 may store predictive possession value model 204 in database 106.

PV computing device 102 may receive personal data 206 and property data 206 associated with a user associated with user device 108. Personal data 206 may include demographics data (e.g., age, sex, income level, marital status, etc.), and property data 206 may include residence information and location (e.g., address of residence, residence square footage, residence type, etc.). Based at least in part upon the received personal data 206 and property data 206, PV computing device 102 may predict a value 208 of items associated with the user based at least in part upon predictive possession value model 204. PV computing device 102 may store predicted one or more values 208 in database 106. Further, based at least in part upon predicted one or more values 208, PV computing device 102 may determine a maximum reimbursement amount 210 associated with an insurance policy of the user. PV computing device 102 may transmit maximum reimbursement amount 210 to insurance provider device 110 and/or store maximum reimbursement amount 210 in database 106.

In response to a claim event (e.g., fire, flood, burglary, theft, etc.), PV computing device 102 may receive a claim 212 associated with user computing device 108. Claim 212 may include a list of lost items and/or a list of spared items associated with the claim event. PV computing device 102 may determine an estimated value 214 associated with the list of lost items and/or spared items, and PV computing device 102 may store estimated value 214 in database 106. Based at least in part upon estimated value 214, PV computing device 102 may determine an actual reimbursement amount 216 for the user. For example, PV computing device 102 may determine that actual reimbursement amount 216 is maximum reimbursement amount 210 minus estimated value 214 of spared items. PV computing device 102 may transmit actual reimbursement amount 216 to insurance provider device 110. Further, PV computing device 102 may transmit actual reimbursement amount 216 to user computing device 108 (e.g., on behalf of insurance provider 110). Actual reimbursement amount 216 may be provided to user device 108 in a form of at least one of a check, a direct deposit, cash, a digital wallet credit, and a prepaid card.

Exemplary Policyholder Devices

Figure 3:
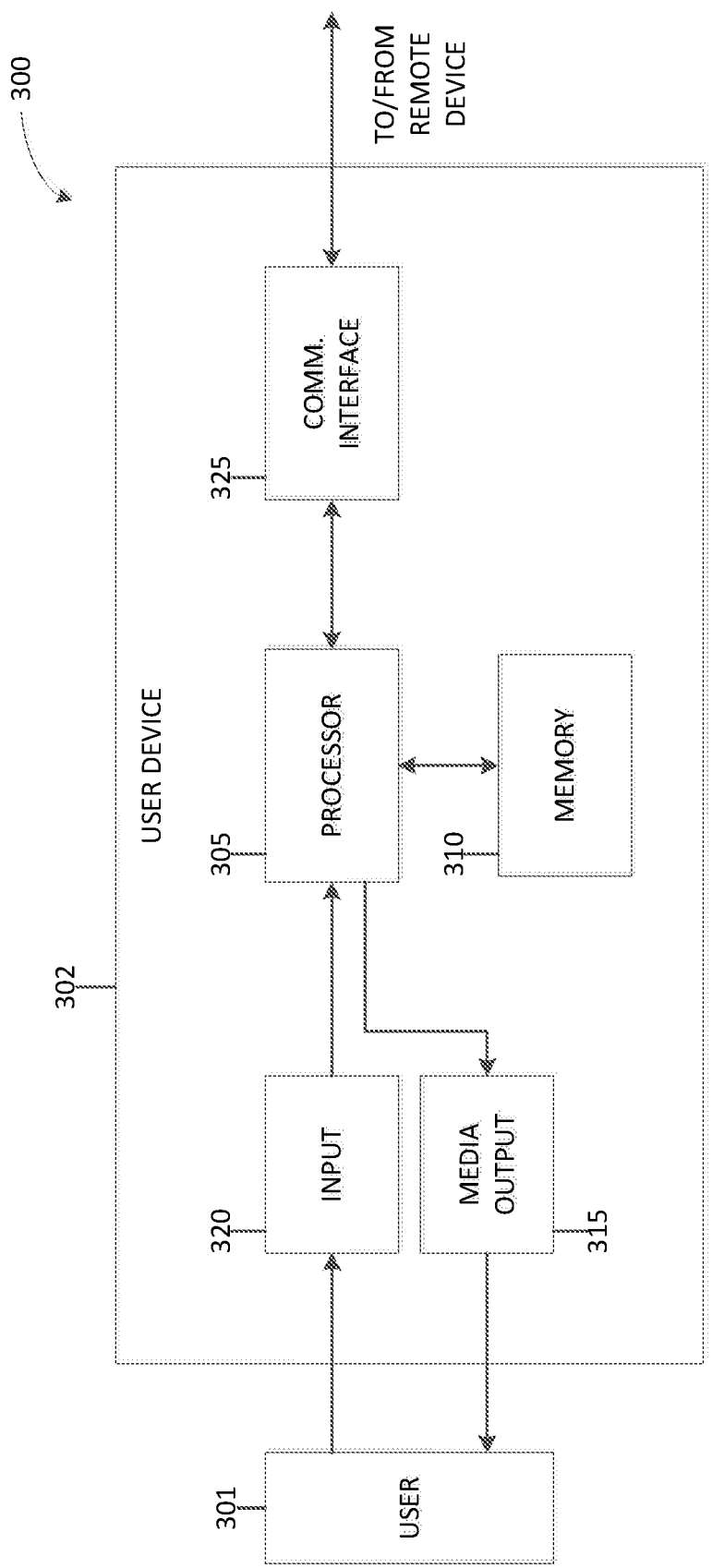
FIG. 3 illustrates an exemplary configuration of a user computer device that may be used with the PV computer system shown in FIG. 1.

FIG. 3 depicts an exemplary configuration 300 of a user computing device 302 in accordance with one embodiment of the present disclosure. User computing device 302 may be operated by a user 301. User computing device 302 may include, but is not limited to, user computing device 108 and insurance provider device 110 (shown in FIG. 1). User computing device 302 may include a processor 305 for executing instructions. In some embodiments, executable instructions may be stored in a memory 310. Processor 305 may include one or more processing units (e.g. in a multi-core configuration). Memory 310 may be any device allowing information such as executable instructions and/or transaction data to be stored and retrieved. Memory 310 may include one or more computer readable media.

User computing device 302 may also include one media output component 315 for presenting information to user 301. Media output component 315 may be any component capable of conveying information to user 301. In some embodiments, media output component 315 may include an output adapter (not shown) such as a video adapter and/or an audio adapter. An output adapter may be operatively coupled to processor 305 and operatively coupleable to an output device such as a display device (e.g. a cathode ray tube (CRT), liquid crystal display (LCD), light emitting diode (LED) display, or "electronic ink" display) or an audio output device (e.g. a speaker or headphones).

In some embodiments, media output component 315 may be configured to present a graphical user interface (e.g. a web browser and/or a client application) to user 301. In some embodiments, user computing device 302 may include an input device 320 for receiving input associated with user 301. User 301 may use input device 320 to, without limitation, transmit personal data and property data to PV computing device 102, adjust and/or accept the predicted one or more values of items associated with the user, and/or transmit a claim to PV computing device 102.

Input device 320 may include, for example, a keyboard, a pointing device, a mouse, a stylus, a touch sensitive panel (e.g. a touch pad or a touch screen), a gyroscope, an accelerometer, a position detector, a biometric input device, and/or an audio input device. A single component such as a touch screen may function as both an output device of media output component 315 and input device 320.

User computing device 302 may also include a communication interface 325, communicatively coupled to a remote device such as PV computing device 102 (shown in FIG. 1). Communication interface 325 may include, for example, a wired or wireless network adapter and/or a wireless data transceiver for use with a mobile telecommunications network.

Stored in memory 310 may be, for example, computer readable instructions for providing a user interface to user 301 via media output component 315 and, optionally, receiving and processing input associated with input device 320. A user interface may include, among other possibilities, a web browser and/or a client application. Web browsers enable users, such as user 301, to display and interact with media and other information typically embedded on a web page or a website associated with PV computing device 102. A client application may allow user 301 to interact with, for example, PV computing device 102. For example, instructions may be stored by a cloud service, and the output of the execution of the instructions sent to the media output component 315.

Exemplary Server Devices

Figure 4:
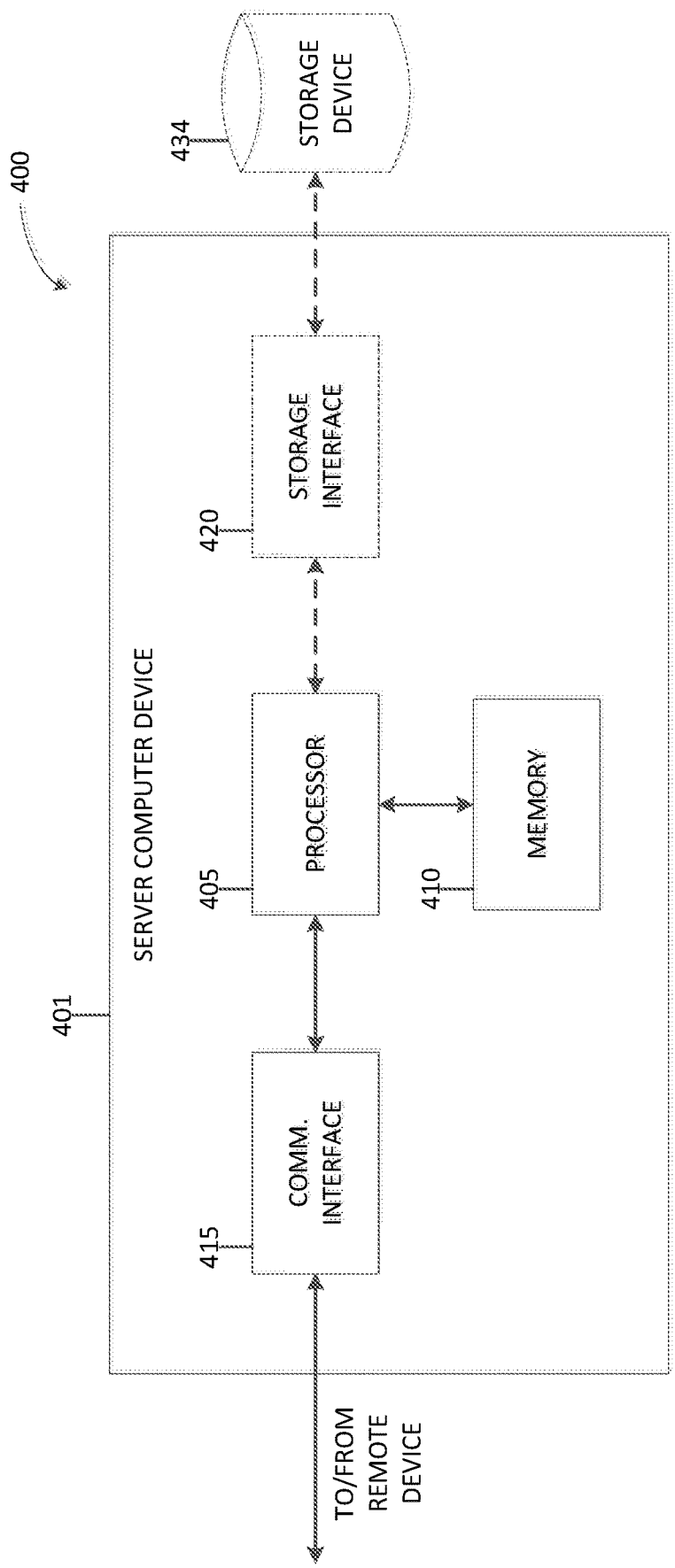
FIG. 4 illustrates an exemplary configuration of a server system that may be used with the PV computer system shown in FIG. 1.

FIG. 4 depicts an exemplary configuration 400 of server system, in accordance with one embodiment of the present disclosure. Server computing device 401 may include, but is not limited to, PV computing device 102 and/or database server 104 (shown in FIG. 1). Server computing device 401 may also include a processor 405 for executing instructions. Instructions may be stored in a memory area 410. Processor 405 may include one or more processing units (e.g. in a multi-core configuration).

Processor 405 may be operatively coupled to a communication interface 415 such that server computing device 401 is capable of communicating with a remote device such as another server computing device 401, PV computing device 102, user computing device 108, and insurance provider device 110 (shown in FIG. 1).

Processor 405 may also be operatively coupled to a storage device 434. Storage device 434 may be any computer-operated hardware suitable for storing and/or retrieving data, such as, but not limited to, data associated with database 106 (shown in FIG. 1). In some embodiments, storage device 434 may be integrated in server computing device 401. For example, server computing device 401 may include one or more hard disk drives as storage device 434.

In other embodiments, storage device 434 may be external to server computing device 401 and may be accessed by a plurality of server computing devices 401. For example, storage device 434 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 435 via a storage interface 420. Storage interface 420 may be any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Processor 405 may execute computer-executable instructions for implementing aspects of the disclosure. In some embodiments, processor 405 may be transformed into a special purpose microprocessor by executing computer-executable instructions or by otherwise being programmed.

Exemplary Computer Devices

Figure 5:
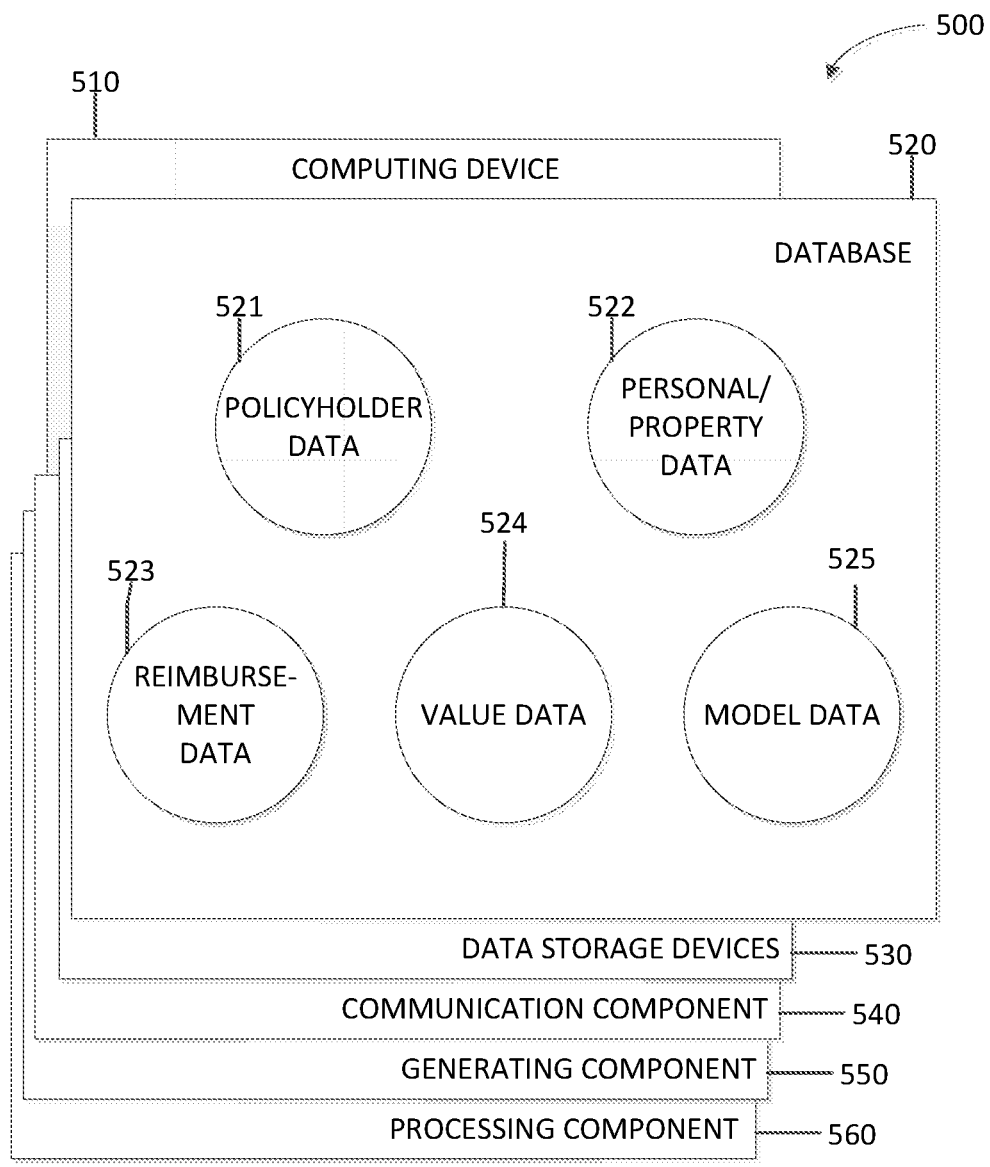
FIG. 5 illustrates a diagram of components of one or more exemplary computing devices that may be used in the PV computer system shown in FIG. 1.

FIG. 5 depicts a diagram 500 of components of one or more exemplary computing devices 510 that may be used in PV computer system 100 (shown in FIG. 1). In some embodiments, computing device 510 may be similar to PV computing device 102 (shown in FIG. 1). Database 520 may be coupled with several separate components within computing device 510, which perform specific tasks. In this embodiment, database 520 may include policyholder data 521 (e.g., historical policyholder records), personal/property data 522 (e.g., demographics data and residency information), reimbursement data 523 (e.g., maximum reimbursements and actual reimbursements), value data 524 (e.g., predicted one or more values associated with one or more items associated with users), and/or model data 525 (e.g., associated with predicted possession value model). In some embodiments, database 520 is similar to database 106 (shown in FIG. 1).

Computing device 510 may include database 520, as well as data storage devices 530. Computing device 510 may also include a communication component 540 for handling communication between PV computing device 102, user computing devices 108, and insurance provider devices 110. Computing device 510 may further include generating component 550 for generating the predictive possession value model. Moreover, computing device 510 may include processing component 560 for processing personal and property data of users to determine reimbursement amounts and predict a value associated with items of the users.

Figure 6:
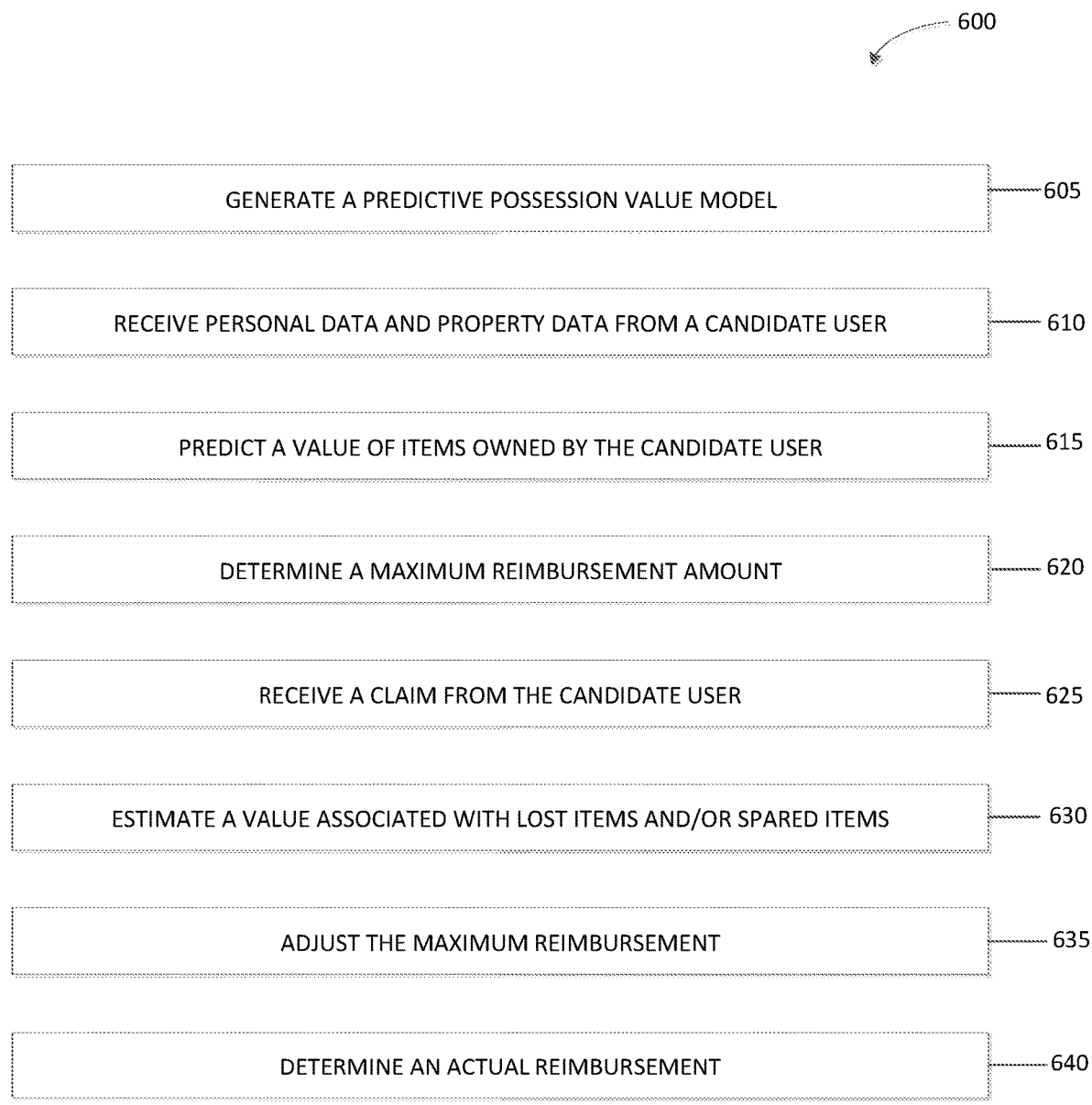
FIG. 6 illustrates a flow chart of an exemplary computer-implemented process that may be carried out by the PV computer system shown in FIG. 1.

Exemplary Computer-Implemented Methods for Generating and Maintaining an Inventory of Personal Possessions FIG. 6 illustrates a flow chart of an exemplary computer-implemented method 600 for generating a predicted one or more values of personal property items associated with a candidate user enrolling in an insurance policy. Method 600 may be carried out by PV computer system 100 (shown in FIG. 1), and more specifically, may be carried out by a computing device (e.g., PV computing device 102) of PV computer system 100.

Method 600 may include generating 605 a predictive possession value model based at least in part upon a plurality of historical policyholder records associated with policyholders. The plurality of historical policyholder records may include (i) historical policy data including one or more values associated with one or more items owned by each policyholder of the plurality of policyholders, (ii) personal data associated with each policyholder of the plurality of policyholders, and (iii) property data associated with each policyholder of the plurality of policyholders. Further, method 600 may include receiving 610 personal data and property data associated with the candidate user. Personal data may include demographics data, and property data may include residence information. Method 600 may further include predicting 615, based at least in part upon received 610 personal data and property data, a one or more values associated with one or more items owned by the candidate user based at least in part upon the received personal data and property data. A maximum reimbursement amount may be determined 620 based at least in part upon the predicted 615 value.

Further, method 600 may include receiving 625 a claim associated with the candidate user in response to a claim event. The claim may include a list of lost items and/or a list of spared items. A value associated with the list of list items and/or the list of spared items may be estimated 630. Further, the maximum reimbursement amount may be adjusted 635 based at least in part upon the estimated 630 value. Method 600 may additionally include determining 640 an actual reimbursement amount based at least in part upon the adjusted 635 maximum reimbursement amount.

Exemplary Embodiments & Functionalities

In the exemplary embodiment, a computing system for generating a predicted one or more values of personal property items associated with a candidate user enrolling in an insurance policy may be provided. The computing system may include one processor in communication with at least one memory device, and the at least one processor may be configured to: (i) generate a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receive personal data and property data associated with the candidate user, (iii) predict, based at least in part upon the generated predictive possession model, a one or more values associated with one or more items owned by the candidate user based at least in part upon the received personal data and property data, (iv) determine a maximum reimbursement amount for the candidate user based at least in part upon the predicted one or more values, (v) receive a claim associated with the candidate user in response to a claim event, wherein the claim includes one of a list of lost items and a list of spared items, (vi) estimate a value associated with the claim, (vii) adjust the maximum reimbursement amount based at least in part upon the estimated value associated with the claim, and/or (viii) determine an actual reimbursement amount for the candidate user based at least in part upon the adjusted maximum reimbursement. The computing system may include additional, less, or alternate functionality, including that discussed elsewhere herein. The computer system may include additional, less, or alternate functionality, including that discussed elsewhere herein.

For example, the at least one processor may further be configured to: (i) provide the actual reimbursement amount to the candidate user, wherein the actual reimbursement amount is provided in a form of at least one of a check, a direct deposit, cash, a digital wallet credit, and a prepaid card, (ii) prompt the candidate user to at least one of adjust the predicted one or more values and accept the predicted one or more values, and (iii) store, in the at least one memory device, at least one of the adjusted predicted one or more values and the accepted predicted one or more values. Further, generating the predictive possession value model may include utilizing at least one of machine learning and artificial intelligence techniques to predict one or more values of one or more items owned by each policyholder of the plurality of policyholders based at least in part upon personal data and property data associated with each policyholder of the plurality of policyholders, and the at least one processor may further be configured to: (i) continually retrieve one or more additional historical policyholder records, (ii) update the predictive possession value model based at least in part upon the one or more additional historical policyholder records, and (iii) store, in the at least one memory device, the updated predictive possession value model.

Further, for example, adjusting the maximum reimbursement amount may include, when a list of spared items is included in the claim, reducing the determined maximum reimbursement by the estimated value of the spared items. Additionally, for example, wherein adjusting the maximum reimbursement amount may include, when a list of lost items is included in the claim, (i) comparing the estimated value of the lost items to the predicted one or more values of items to estimate a value of the spared items and (ii) reducing the determined maximum reimbursement by the estimated value of the spared items. The personal data of the candidate user may include one of demographic data, age data, marital status, education, and employment data associated with the candidate user. The property data of the candidate user may include one of residency data, location data, and square footage data associated with a residence of the candidate user.

In another embodiment, a computer-implemented method for a computer-implemented method for generating a predicted one or more values of personal property items associated with a candidate user enrolling in an insurance policy based at least in part upon a computing system including one processor in communication with at least one memory device is provided. The method may include: (i) generating a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receiving personal data and property data associated with the candidate user, (iii) predicting, based at least in part upon the generated predictive possession model, a one or more values associated with one or more items owned by the candidate user based at least in part upon the received personal data and property data, (iv) determining a maximum reimbursement amount for the candidate user based at least in part upon the predicted one or more values, (v) receiving a claim associated with the candidate user in response to a claim event, wherein the claim includes one of a list of lost items and a list of spared items, (vi) estimating a value associated with the claim, (vii) adjusting the maximum reimbursement amount based at least in part upon the estimated value associated with the claim, and/or (viii) determining an actual reimbursement amount for the candidate user based at least in part upon the adjusted maximum reimbursement. The method may include additional, less, or alternate actions, including those discussed elsewhere herein.

In yet another embodiment, at least one non-transitory computer-readable media having computer-executable instructions thereon may be provided, wherein when executed by at least one processor of a computing system causes the at least one processor to: (i) generate a predictive possession value model based at least in part upon a plurality of historical policyholder records associated with a plurality of policyholders, wherein the plurality of historical policyholder records include (a) historical policy data including one or more values associated with one or more items owned by each policyholder of the plurality of policyholders, (b) personal data associated with each policyholder of the plurality of policyholders, and (c) property data associated with each policyholder of the plurality of policyholders, (ii) receive personal data and property data associated with the candidate user, (iii) predict, based at least in part upon the generated predictive possession model, a one or more values associated with one or more items owned by the candidate user based at least in part upon the received personal data and property data, (iv) determine a maximum reimbursement amount for the candidate user based at least in part upon the predicted one or more values, (v) receive a claim associated with the candidate user in response to a claim event, wherein the claim includes one of a list of lost items and a list of spared items, (vi) estimate a value associated with the claim, (vii) adjust the maximum reimbursement amount based at least in part upon the estimated value associated with the claim, and/or (viii) determine an actual reimbursement amount for the candidate user based at least in part upon the adjusted maximum reimbursement. The instructions may direct additional, less, or alternate functionality, including that discussed elsewhere herein.

Examples of Machine Learning and Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained based at least in part upon supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based at least in part upon example inputs in order to make valid and reliable predictions for novel inputs. For example, models may be created based at least in part upon historical policyholder data to predict what personal possessions are associated with users, and more specifically, the personal data of users (e.g., demographics and/or location data).

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based at least in part upon the discovered rule, accurately predict the correct output. In unsupervised machine learning, the processing element may be needed to find its own structure in unlabeled example inputs. In one embodiment, machine learning techniques may be used to extract data about the computer device, the user of the computer device, driver and/or vehicle, home owner and/or home, renter, geolocation information, image data, home sensor data, and/or other data.

Based at least in part upon these analyses, the processing element may learn how to identify characteristics and patterns that may then be applied to analyzing sensor data, authentication data, image data, mobile device data, and/or other data. For example, the processing element may learn, with the user's permission or affirmative consent, to predict new personal possessions of the user (e.g., that the user acquires after the actual inventory has been created and/or generated).

Examples of Additional Considerations

As will be appreciated based at least in part upon the foregoing specification, the above-described embodiments of the disclosure may be implemented based at least in part upon computer programming or engineering techniques including computer software, firmware, hardware or any combination or subset thereof. Any such resulting program, having computer-readable code means, may be embodied or provided within one or more computer-readable media, thereby making a computer program product, e.g. an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly associated with one medium, by copying the code associated with one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g. magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems based at least in part upon micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable medium. In an exemplary embodiment, the system is executed on a single computer system, without needed a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system may include multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate associated with other components and processes described herein. Each component and process can also be used in combination with other assembly packages and processes. The present embodiments may enhance the functionality and functioning of computers and/or computer systems.

Although specific embodiments of the present disclosure have been described, it will be understood by those of skill in the art that there are other embodiments that are equivalent to the described embodiments. Accordingly, it is to be understood that the present disclosure is not to be limited by the specific illustrated embodiments.

What is claimed:

1. A computing system for generating one or more predicted values of one or more personal property items owned by a candidate user, the computing system including at least one processor in communication with at least one memory device, the at least one processor configured to:
   generate a predictive possession value model based at least in part upon a plurality of historical policyholder records associated with a plurality of policyholders, by utilizing a machine learning model to predict one or more item values of one or more items owned by each policyholder of the plurality of policyholders based at least in part upon personal data and property data associated with each policyholder of the plurality of policyholders,
   wherein the plurality of historical policyholder records include (i) historical policy data including the one or more item values associated with the one or more items owned by each policyholder of the plurality of policyholders and historical insurance claim data associated with the plurality of policyholders, (ii) the personal data associated with each policyholder of the plurality of policyholders, and (iii) the property data associated with each policyholder of the plurality of policyholders;
   receive personal data and property data associated with the candidate user;
   determine, based at least in part upon the generated predictive possession model, the one or more predicted values of the one or more personal property items owned by the candidate user based at least in part upon the received personal data and the received property data;
   determine a maximum reimbursement amount for the candidate user based at least in part upon the one or more predicted values;
   receive a claim associated with the candidate user in response to a claim event, wherein the claim includes one of a list of lost items and a list of spared items;

estimate a claim value associated with the claim based at least in part on the list of lost items and the list of spared items;

adjust the maximum reimbursement amount based at least in part upon the estimated claim value associated with the claim;

determine an actual reimbursement amount for the candidate user based at least in part upon the adjusted maximum reimbursement; and provide the actual reimbursement amount to the candidate user, wherein the actual reimbursement amount is provided in a form of at least one selected from a group consisting of a check, a direct deposit, cash, a digital wallet credit, and a prepaid card.

2. The computing system of claim 1, wherein the at least one processor is further configured to:

prompt the candidate user to at least one of adjust the one or more predicted values and accept the one or more predicted values; and store, in the at least one memory device, at least one of the one or more adjusted predicted values and the one or more accepted predicted values.

3. The computing system of claim 1, wherein the at least one processor is further configured to:

continually retrieve one or more additional historical policyholder records;

update the predictive possession value model based at least in part upon the one or more additional historical policyholder records; and store, in the at least one memory device, the updated predictive possession value model.

4. The computing system of claim 1, wherein the at least one processor is configured to adjust the maximum reimbursement amount by:

reducing the determined maximum reimbursement amount by one or more values associated with the list of spared items.

5. The computing system of claim 4, wherein the at least one processor is configured to adjust the maximum reimbursement amount by:

estimating the one or more values associated with the list of spared items at least by comparing one or more values associated with the list of lost items to the one or more predicted values; and reducing the determined maximum reimbursement amount by the one or more estimated values associated with the list of spared items.

6. The computing system of claim 1, wherein the personal data of the candidate user includes at least one selected from a group consisting of demographic data, age data, marital status, education, and employment data associated with the candidate user, and wherein the property data of the candidate user includes one of residency data, location data, and square footage data associated with a residence of the candidate user.

7. A computer-implemented method for generating one or more predicted values of one or more personal property items owned by a candidate user, the method implemented on a computer device including at least one processor in communication with at least one memory device, said method comprising:

generating a predictive possession value model based at least in part upon a plurality of historical policyholder records associated with a plurality of policyholders, by utilizing a machine learning model to predict one or more item values of one or more items owned by each policyholder of the plurality of policyholders based at least in part upon personal data and property data associated with each policyholder of the plurality of policyholders, wherein the plurality of historical policyholder records includes (i) historical policy data including the one or more item values associated with the one or more items owned by each policyholder of the plurality of policyholders, (ii) the personal data associated with each policyholder of the plurality of policyholders, and (iii) the property data associated with each policyholder of the plurality of policyholders;

receiving personal data and property data associated with the candidate user;

determining, based at least in part upon the generated predictive possession model, the one or more predicted values of the one or more personal property items owned by the candidate user based at least in part upon the received personal data and the received property data;

determining a maximum reimbursement amount for the candidate user based at least in part upon the one or more predicted values;

receiving a claim associated with the candidate user in response to a claim event, wherein the claim includes one of a list of lost items and a list of spared items;

estimating a claim value associated with the claim based at least in part on the list of lost items and the list of spared items;

adjusting the maximum reimbursement amount based at least in part upon the estimated claim value associated with the claim;

determining an actual reimbursement amount for the candidate user based at least in part upon the adjusted maximum reimbursement; and providing the actual reimbursement amount to the candidate user, wherein the actual reimbursement amount is provided in a form of at least one selected from a group consisting of a check, a direct deposit, cash, a digital wallet credit, and a prepaid card.

8. The method of claim 7 further comprising:

prompting the candidate user to at least one of adjust the predicted one or more values and accept the one or more predicted values; and storing, in the at least one memory device, at least one selected from a group consisting of the one or more adjusted predicted values and the one or more accepted predicted values.

9. The method of claim 7 further comprising:

continually retrieving one or more additional historical policyholder records;

updating the predictive possession value model based at least in part upon the one or more additional historical policyholder records; and storing, in the at least one memory device, the updated predictive possession value model.

10. The method of claim 7, wherein the adjusting the maximum reimbursement amount includes:

reducing the determined maximum reimbursement by one or more values associated with the list of spared items.

11. The method of claim 10, wherein the adjusting the maximum reimbursement amount includes:

estimating the one or more values associated with the list of spared items at least by comparing one or more values associated with the list of lost items to the one or more predicted values; and reducing the determined maximum reimbursement by the one or more estimated values of the list of spared items.

12. At least one non-transitory computer-readable media having computer-executable instructions thereon, wherein when executed by at least one processor of a computing device in communication with at least one memory device, cause the at least one processor to:
  generate a predictive possession value model based at least in part upon a plurality of historical policyholder records associated with a plurality of policyholders, by utilizing a machine learning model to predict one or more item values of one or more items owned by each policyholder of the plurality of policyholders based at least in part upon personal data and property data associated with each policyholder of the plurality of policyholders,
  wherein the plurality of historical policyholder records include (i) historical policy data including the one or more item values associated with the one or more items owned by each policyholder of the plurality of policyholders, (ii) the personal data associated with each policyholder of the plurality of policyholders, and (iii) the property data associated with each policyholder of the plurality of policyholders;
  receive personal data and property data associated with the candidate user;
  determine, based at least in part upon the generated predictive possession model, the one or more predicted values of the one or more personal property items owned by the candidate user based at least in part upon the received personal data and the received property data;
  determine a maximum reimbursement amount for the candidate user based at least in part upon the one or more predicted values;
  receive a claim associated with the candidate user in response to a claim event, wherein the claim includes one of a list of lost items and a list of spared items;
  estimate a value associated with the claim based at least in part on the list of lost items and the list of spared items;
  adjust the maximum reimbursement amount based at least in part upon the estimated claim value associated with the claim;
  determine an actual reimbursement amount for the candidate user based at least in part upon the adjusted maximum reimbursement; and
  provide the actual reimbursement amount to the candidate user, wherein the actual reimbursement amount is provided in a form of at least one selected from a group consisting of a check, a direct deposit, cash, a digital wallet credit, and a prepaid card.

13. The computer-readable media of claim 12, wherein the computer-executable instructions further cause the at least one processor to:
  prompt the candidate user to at least one of adjust the one or more predicted values and accept the one or more predicted values; and
  store, in the at least one memory device, at least one selected from a group consisting of the one or more adjusted predicted values and the one or more accepted predicted values.

14. The computer-readable media of claim 12, wherein the computer-executable instructions further cause the at least one processor to:
  continually retrieve one or more additional historical policyholder records;
  update the predictive possession value model based at least in part upon the one or more additional historical policyholder records; and
  store, in the at least one memory device, the updated predictive possession value model.

* * * * *